D. T. Drake,
Mortising Window Blinds,
N° 17,141. Patented Apr. 28, 1857.
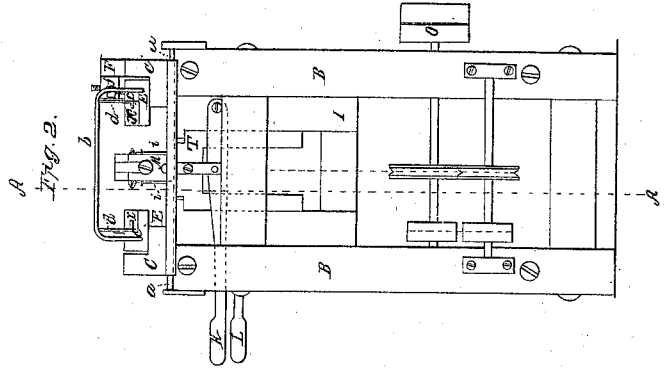
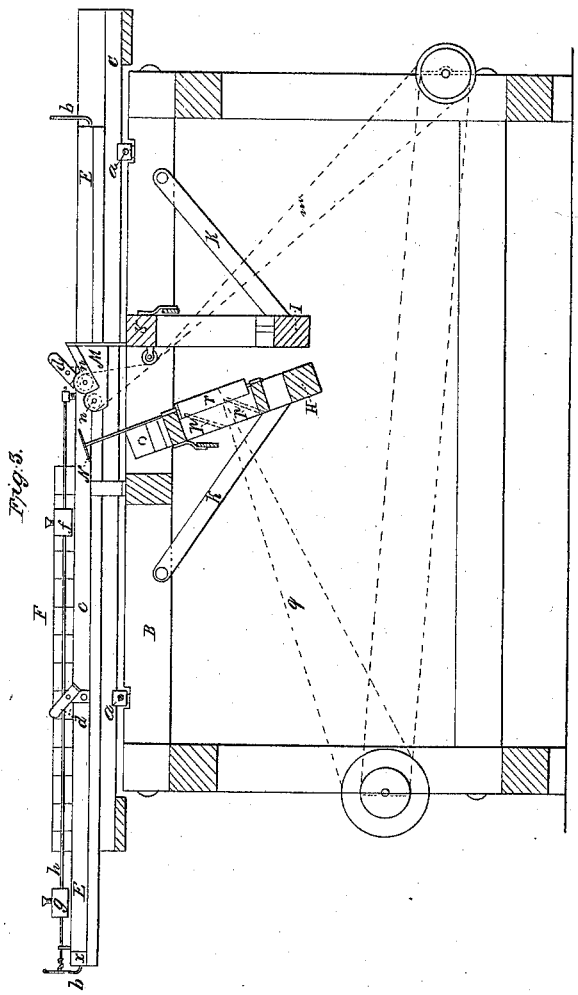
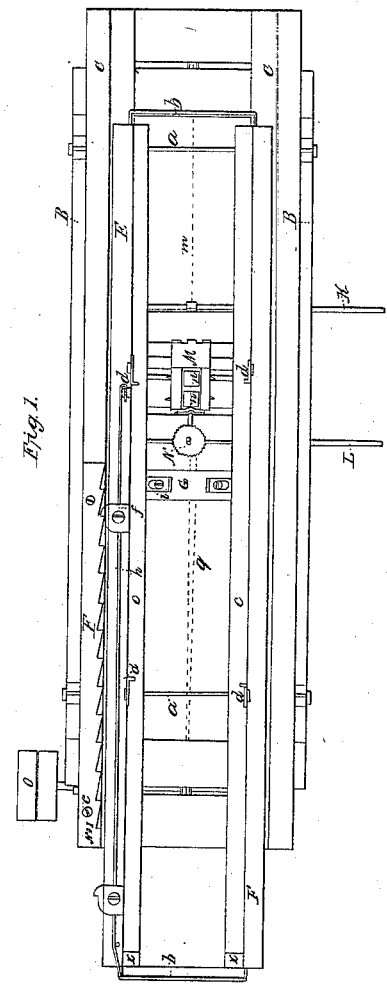

UNITED STATES PATENT OFFICE.

D. T. DRAKE, OF LEOMINSTER, MASSACHUSETTS.

MACHINE FOR MORTISING THE STILES OF BLIND-SLATS.

Specification of Letters Patent No. 17,141, dated April 28, 1857.

*To all whom it may concern:*

Be it known that I, D. T. Drake, of Leominster, in the county of Worcester and State of Massachusetts, have invented a new and Improved Machine for Cutting Mortises for Window-Blind Slats, of which the following is a full, clear, and exact description, reference being had to the accompanying drawings, making part of this specification, in which—

Figure 1 is a plan; Fig. 2 an end view; Fig. 3 a longitudinal vertical section on the line A, A, of Fig. 1.

In the said drawings B is the frame of the machine, on the top of which moves the long carriage C, sliding back and forth across the machine on rods or ways 2. In rectangular grooves in this carriage C (seen in section in Fig. 2) slides the second carriage E; this carriage consists of two long bars connected together at the ends by the rods or braces $b$ extending from one to the other. These bars have on their inner sides rectangular grooves $c$, in which are laid the stiles or side pieces of the blind which are to be mortised; these are held firm in the grooves $c$ by the clamps $d$ attached to the bar. Attached to the top of one side of the carriage C is a pattern rack F which is secured by screws $e$; this rack has cut on its inner edge notches at the distance apart at which the mortises are to be cut. Attached by suitable standards to the top of one bar of the carriage E next to the rack is a rod or spring way $h$ on which slides two blocks $f$, $g$, which act as pawls to the rack F; these may be adjusted at the proper place on the rod $h$ and be there secured by tightening a screw in each block. On a cross brace G of the frame B are adjustable stops $i$ which arrest the carriage C as it is moved on its ways $a$ and which regulate the distance which the carriage moves and consequently the depth of the mortise cut.

Pivoted at $v$ to the underside of the frame B are the cutter frames H and I which are adjusted and steadied by braces $k$ leading from the lower end of each to the frame B. In the cutter frames slide gates (one of which is seen at T Fig. 2) which carry the cutters; there gates are moved up and down in suitable ways in their frames by the hand levers K and L one of which is attached to each gate and is pivoted beyond the gate to its frame. The gate in the frame I which is generally set nearly perpendicular slides in straight grooves, and carries a head M in which revolve two finishing bits, driven by a band $m$ over their pulleys $n$, a guide pulley $o$ being attached to the frame I. The gate of the frame H has on its sides grooves which move on inclined ways $p$ in the frame (seen dotted in Fig. 3) which causes its cutter to be raised and lowered in nearly a perpendicular line, and prevents the band $q$ from being stretched as the gate descends; this cutter N is revolved by the band $q$ on a pulley $r$ on its shaft; the bands $q$ and $m$ are driven by power applied to the pulleys O.

Operation: The frames H and I are adjusted to give the required inclination to the cutter N and bit head M; the stiles or side rails of the blind, which are to be mortised are laid in the grooves $c$ in the carriage E, one on each side against the stops $x$ at one end of the grooves, and are there secured by the clamps $d$, the carriage E is slid back toward the left on the carriage C until the place where the first mortise is to be cut is opposite to the cutter N. The pawl $f$ is now adjusted on the rod $h$ opposite to the first notch No. 1 on the rack bar F (the notches on which correspond with the required distance of the mortises from each other). By means of the hand lever K the gate T in the frame I is lowered until the finishing bits in the head M are below the plane in which the stuff operated on travels; this is done to prevent them from disfiguring the work beyond where the first mortise is to be made. The stops $i$ on the cross piece G are adjusted to give the proper depth to the cut. The carriage C is now moved on its ways $a$ across the machine up against one of the stops $i$ the cutter N making a cut for the first mortise in one of the stiles. The carriage C is now brought back against the other stop $i$ and a cut is made in the opposite stile. The carriage E is then slid along the distance of one notch of the bar F, the spring of the rod $h$ allowing the pawl $f$ to slide and drop into the next notch, when the movements of the carriage C are repeated making a second pair of cuts; and the same is done for a third pair when the first cut will be opposite to the bits in the head M the distance of the cutter N and bits $n$ apart having been previously adjusted. The lever K is now raised and the bits are brought up into line with the first cut so that the next time the carriage C is moved up, the two bits enter one into each end of the cut and finish it ready to receive the slat, the bits being rapidly revolved by the band m. The two carriages are then moved alternately as above described until the cutter N makes the last cut in the upper half of the stile; an omission of the cuts is then necessary for a short distance in the middle of the length of the stile where the cross piece of blind comes. For this reason the gate of the frame H is lowered by the hand lever L carrying the cutter N down out of the way. The carriages are then moved until the bits have finished their work in the last cut. The bit head M is then depressed out of the way, the cutter N is raised into line and the carriage E is moved along until this cutter is opposite the place where the next mortise is to be made below the space left for the cross bar of the blind. The pawl g is now adjusted and secured on the rod h opposite to notch No. 1 of the bar F and the operation of cutting is continued as before the bits being again brought up into line when the next cut to be finished has come opposite to them. And when the last cut is made at the lower end of the stile the cutter N is dropped, and the bits finish their work, when the stiles are removed to be replaced with others.

By the above described machine I am enabled to cut the mortises for slats of window blinds, with accuracy and despatch, the bevel of the mortise and the distance of one mortise from the next one, as well as the depth of the cut being easily and nicely adjustable.

The pattern bar F may be readily replaced by others with different sized notches to correspond with the required distances of the mortises.

When thicker stuff is used for the stiles, and longer mortises are to be cut, a larger cutter may replace the one N and the finishing bits may be set farther apart one of them being made adjustable in its bearings in the head M.

If instead of the mortises, holes are to be bored in the stiles for revolving slats, the cutter N may be dropped out of the way, and the bits in the head M being removed, one of them may be replaced by a bit of a size suitable for boring the holes required.

What I claim as my invention and desire to secure by Letters Patent is—

The within described machine for cutting mortises for window blind slats, constructed in the manner substantially as herein set forth; and consisting essentially in the carriages E and C in combination with the cutters N and bits n operating in the manner specified.

D. T. DRAKE.

Witnesses:
 Thos. R. Roach,
 P. E. Teschemacher.